(12) United States Patent
Ficara et al.

(10) Patent No.: US 12,192,770 B2
(45) Date of Patent: Jan. 7, 2025

(54) IDENTIFYING ROGUE WIRELESS DEVICES USING MAC ADDRESS ROTATION TECHNIQUES

(71) Applicant: Cisco Technology, Inc., San Jose, CA (US)

(72) Inventors: Domenico Ficara, Vaud (CH); Roberto Muccifora, Ropraz (CH); Amine Choukir, Ecublens (CH); Robert Barton, Richmond (CA); Jerome Henry, Pittsboro, NC (US); Arun Khanna, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 54 days.

(21) Appl. No.: 17/731,689

(22) Filed: Apr. 28, 2022

(65) Prior Publication Data

US 2023/0354034 A1 Nov. 2, 2023

(51) Int. Cl.
*H04W 12/122* (2021.01)
*H04W 12/106* (2021.01)
*H04W 12/73* (2021.01)

(52) U.S. Cl.
CPC ....... *H04W 12/122* (2021.01); *H04W 12/106* (2021.01); *H04W 12/73* (2021.01)

(58) Field of Classification Search
CPC .. H04W 12/122; H04W 12/73; H04W 12/106
(Continued)

(56) References Cited

U.S. PATENT DOCUMENTS 9,220,007 B2 12/2015 Remaker
2009/0235354 A1\* 9/2009 Gray ................... H04L 63/1416
709/224
(Continued)

FOREIGN PATENT DOCUMENTS

CN 1578276 A \* 2/2005 ....... H04L 29/12254
CN 102427460 A \* 4/2012
(Continued)

OTHER PUBLICATIONS

Kao et al., "An Accurate Fake Access Point Detection Method Based on Deviation of Beacon Time Interval," 2014 IEEE Eighth International Conference on Software Security and Reliability-Companion, San Francisco, CA, USA, 2014, pp. 1-2, doi: 10.1109/SERE-C.2014.13. (Year: 2014).\*
(Continued)

*Primary Examiner* — Peter C Shaw
(74) *Attorney, Agent, or Firm* — Edell, Shapiro & Finnan, LLC

(57) ABSTRACT

A method is provided that is performed in a wireless network to detect a rogue wireless device. The method comprises detecting a suspect wireless device in the wireless network based on messages transmitted by the suspect wireless device using a first Media Access Control (MAC) address that is also used by a valid wireless device in the wireless network. When a suspect wireless device is detected, the method next includes sending to the valid wireless device in the wireless network a request configured to cause the valid wireless device to change its MAC address. After the valid wireless device has changed its MAC address, the method involves observing messages transmitted by the suspect wireless device in the wireless network. The method then includes determining that the suspect wireless device is a
(Continued)

rogue device when the suspect wireless device continues to transmit messages using the first MAC address.

20 Claims, 6 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2014/0161027 A1* | 6/2014 | Larue | H04W 12/122 |
| | | | 370/328 |
| 2015/0082429 A1 | 3/2015 | Rangarajan et al. | |
| 2015/0172289 A1* | 6/2015 | Kwon | H04W 12/122 |
| | | | 726/3 |
| 2016/0269359 A1 | 9/2016 | Adrangi et al. | |
| 2017/0244732 A1 | 8/2017 | Manjunath et al. | |
| 2019/0174295 A1 | 6/2019 | Seidman et al. | |
| 2019/0334806 A1 | 10/2019 | Sugatoor et al. | |
| 2020/0107273 A1 | 4/2020 | Kyou et al. | |
| 2020/0137055 A1* | 4/2020 | Isola | H04L 63/101 |
| 2020/0213352 A1* | 7/2020 | Fainberg | H04L 63/0853 |
| 2020/0322423 A1 | 10/2020 | Sheth et al. | |
| 2021/0068172 A1 | 3/2021 | Jeong et al. | |
| 2021/0168115 A1 | 6/2021 | de la Oliva et al. | |
| 2021/0360465 A1 | 11/2021 | Henry et al. | |
| 2022/0103584 A1* | 3/2022 | Tobin | H04L 63/0236 |

FOREIGN PATENT DOCUMENTS

| | | | | |
|---|---|---|---|---|
| CN | 104009896 A | * | 8/2014 | |
| FR | 2694465 A1 | * | 2/1994 | ............... H04L 9/00 |
| JP | 2017005519 A | * | 1/2017 | |
| WO | WO-2010041788 A1 | * | 4/2010 | ....... H04L 29/12028 |
| WO | WO-2014035605 A1 | * | 3/2014 | ......... H04L 61/2038 |
| WO | WO-2016032385 A1 | * | 3/2016 | ......... H04L 61/2038 |
| WO | 2016/077194 A1 | | 5/2016 | |
| WO | WO-2018186511 A1 | * | 10/2018 | ............. H04L 29/06 |
| WO | 2020/148062 A1 | | 7/2020 | |
| WO | 2020/221465 A1 | | 11/2020 | |
| WO | 2020/229409 A1 | | 11/2020 | |

OTHER PUBLICATIONS

Ma et al., "A Hybrid Rogue Access Point Protection Framework for Commodity Wi-Fi Networks," IEEE INFOCOM 2008—The 27th Conference on Computer Communications, Phoenix, AZ, USA, 2008, pp. 1220-1228, doi: 10.1109/INFOCOM.2008.178. (Year: 2008).*
Tian et al., "Securing ARP/NDP From the Ground Up," in IEEE Transactions on Information Forensics and Security, vol. 12, No. 9, pp. 2131-2143, Sep. 2017, doi: 10.1109/TIFS.2017.2695983. (Year: 2017).*
Raguvaran, "Spoofing attack: Preventing in wireless networks," 2014 International Conference on Communication and Signal Processing, Melmaruvathur, India, 2014, pp. 117-121, doi: 10.1109/ICCSP.2014.6949811. (Year: 2014).*
Weniger, "Passive duplicate address detection in mobile ad hoc networks," 2003 IEEE Wireless Communications and Networking, 2003. WCNC 2003., New Orleans, LA, USA, 2003, pp. 1504-1509 vol. 3, doi: 10.1109/WCNC.2003.1200609. (Year: 2003).*
Rohatgi et al., "A Detailed Survey for Detection and Mitigation Techniques against ARP Spoofing," 2020 Fourth International Conference on I-SMAC (IoT in Social, Mobile, Analytics and Cloud) (I-SMAC), Palladam, India, 2020, pp. 352-356, doi: 10.1109/I-SMAC49090.2020.9243604. (Year: 2020).*
Vijayakumar et al., "Prevention of multiple spoofing attacks with dynamic MAC address allocation for wireless networks," 2014 International Conference on Communication and Signal Processing, Melmaruvathur, India, 2014, pp. 1635-1639, doi: 10.1109/ICCSP.2014.6950125. (Year: 2014).*
Nikbakhsh et al., "A Novel Approach for Rogue Access Point Detection on the Client-Side," 2012 26th International Conference on Advanced Information Networking and Applications Workshops, Fukuoka, Japan, 2012, pp. 684-687, doi: 10.1109/WAINA.2012.108. (Year: 2012).*
Maayah et al., "Analysis of RSS Patterns to Detect Rogue Access Points," 2022 International Conference on Emerging Trends in Computing and Engineering Applications (ETCEA), Karak, Jordan, 2022, pp. 1-5, doi: 10.1109/ETCEA57049.2022.10009667. (Year: 2022).*
Srilasak et al., "Integrated Wireless Rogue Access Point Detection and Counterattack System," 2008 International Conference on Information Security and Assurance (isa 2008), Busan, Korea (South), 2008, pp. 326-331, doi: 10.1109/ISA.2008.103. (Year: 2008).*
Ketkhaw et al., "Hidden Rogue Access Point Detection Technique for Wireless Local Area Networks," 2017 21st International Computer Science and Engineering Conference (ICSEC), Bangkok, Thailand, 2017, pp. 1-5, doi: 10.1109/ICSEC.2017.8443803. (Year: 2017).*
Andersdotter, "Summary of discussions on randomized and changing MAC addresses 2014-2019," IEEE P802.11 Wireless LANs, doc.: IEEE 802.11-19/588r2, Apr. 2019, 6 pages.
Alaggan, et al., "Privacy-preserving Wi-Fi Analytics," De Gruyter Open, Proceedings on Privacy Enhancing Technologies; 2018 (2):Feb. 4-26, 2018, 23 pages.
Ansley, "Status of IEEE 802.11 Randomized and changing MAC address Study Group," IEEE P802.11—Randomized and Changing MAC Address (RCM) Study Group (SG)—Meeting Update, IEEE P802.11—Randomized and Changing MAC Address (RCM) TIG, https://www.ieee802.org/11/Reports/rcmtig_update.htm, Jan. 2021, 2 pages.
Hamilton, et al., "Scope of TGbh and TGbi," doc.: IEEE 802.11-21/1470r0, Sep. 2021, 6 pages.
Matte, et al., "Defeating MAC Address Randomization Through Timing Attacks," WiSec'16, Jul. 2016, 6 pages.
Cisco, "Rogue Management in an Unified Wireless Network," https://www.cisco.com/c/en/us/support/docs/wireless/4400-series-wireless-lan-controllers/112045-handling-rogue-cuwn-00.html, Oct. 2020, 40 pages.
Henry, et al., "Randomized and Changing MAC Address Use Cases," draft-henry-madinas-framework-02, Internet Engineering Task Force, Internet-Draft, May 2021, 18 pages.

* cited by examiner

IDENTIFYING ROGUE WIRELESS DEVICES USING MAC ADDRESS ROTATION TECHNIQUES

TECHNICAL FIELD

The present disclosure relates to wireless networking.

BACKGROUND

Attacks involving impersonation of wireless access points (APs) or wireless clients in a wireless network can allow attackers to collect sensitive information. Successful detection of these attacks is therefore important. However, false positives can result because of a few impediments.

When Management Frame Protection (MFP) or Protected Management Frames (PMFs) in an IEEE 802.11 wireless network are not enabled, managed APs are not easily distinguishable from rogue/impersonated APs when receiving beacons or other frames from the APs. This is especially true for an open network (e.g. public hot spots). In public venues, it is common that these protective measures would not be in place. Moreover, there may be other situations in which vendors of AP do not implement MFP.

APs that use multiple antennas and radio-slots and the same Basic Service Set Identifier (BSSID) reused on different bands or channels can make it difficult to correlate the received beacon or message with the actual AP/radio-slot that sent it, as may be the case for IEEE 802.11be Multi-Link Operation (MLO). Moreover, the location of the impersonating device is usually close to the original AP/client whose Media Access Control (MAC) address may be spoofed. This creates challenges in distinguishing a legitimate/valid device from a rogue device.

DESCRIPTION OF EXAMPLE EMBODIMENTS

Overview

Figure 1:
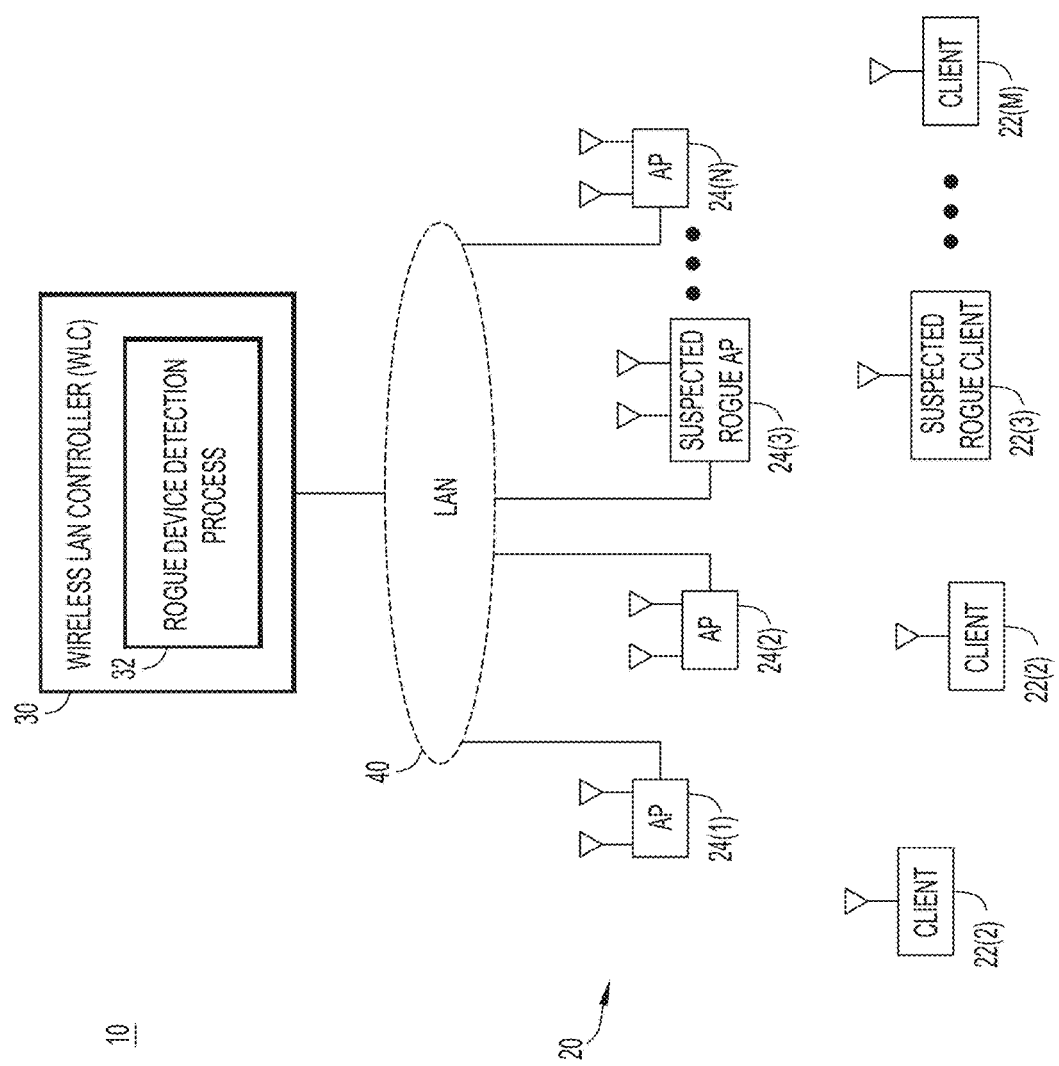
FIG. 1 is a block diagram of a networking environment in which techniques are provided to detect a rogue wireless device using Media Access Control (MAC) address rotation techniques, according to an example embodiment.

In one embodiment, a method is provided that is performed in a wireless network to detect a rogue wireless device. The method comprises detecting a suspect wireless device in the wireless network based on messages transmitted by the suspect wireless device using a first Media Access Control (MAC) address that is also used by a valid wireless device in the wireless network. When a suspect wireless device is detected, the method next includes sending to the valid wireless device in the wireless network a request configured to cause the valid wireless device to change its MAC address. After the valid wireless device has changed its MAC address, the method involves observing messages transmitted by the suspect wireless device in the wireless network. The method then includes determining that the suspect wireless device is a rogue device when the suspect wireless device continues to transmit messages using the first MAC address.

Example Embodiments

Random Changing MAC address (RCM) is a technique developed to ensure security primarily for wireless clients. There are also use cases where APs (the infrastructure device) may need to rotate its MAC address to avoid impersonation and fingerprinting attacks. This is particularly the case when the AP is a personal device (a software AP running on a mobile device sharing the internet connection of the mobile device), and also when the AP is a fixed device (public or private venue rotating the APs MAC addresses to avoid being fingerprinted by public "wardriving" database. In addition, this may become apparent when virtual APs are used. A virtual AP is a multiplexed installation of a single physical Access Point (AP) so that the physical AP presents itself as multiple discrete APs. To wireless clients, each virtual AP appears to be an independent physical AP, even though there is only a single physical AP.

In the case of an impersonated wireless client, the wireless client itself may detect suspicious frames and change its MAC address at will. However, it is also more common that the AP would detect these suspicious frames. This is because the AP implements a wireless intrusion protection process, and thus listens to all frames with a filter to detect attack vectors, while a client device tends to not implement wireless intrusion measures. An AP may ignore frames that do not show the client MAC address in the Receiver Address/Destination Address (RA/DA) field, thus missing frames spoofing the client MAC address as the source.

There is a need for a method to detect MAC address impersonation when rotating MAC address techniques (e.g., RCM) are in use, and to provide appropriate remediation measures. This can be useful in the context of IEEE 802.11bh and IEEE 802.11bi deployments, where the impact to RCM-related wireless and wired network infrastructure is analyzed and solutions are proposed. In particular, through IEEE 802.11bh, standardized methods to allow APs to identify re-associating STAs are being defined. This disclosure extends the scope of the IEEE 802.11bh and 802.11bi specifications to support better impersonation detection.

Presented herein are techniques to trigger a MAC address rotation on managed APs or wireless clients when an impersonating/rogue device is suspected, thus revealing the device as an impersonator. As the valid devices rotate their MAC addresses (without the attacker's prior knowledge), presence of a rogue device is exposed because a rogue device does not rotate its MAC address as expected (through the persistence of a now invalid (no longer valid) MAC address).

A goal of the techniques presented herein is not to enter into a race condition with the rogue device, and rotate impersonated MAC addresses faster than the rogue device can impersonate them. Rather, a goal is to identify a potential impersonating/rogue device, then rotate the (impersonated) valid MAC address to thereby expose the rogue device and its location.

Reference is first made to FIG. 1. FIG. 1 shows a networking environment 10 that includes a wireless network 20. The wireless local area network (WLAN) 20 includes wireless client devices 22(1)-22(M) (also called "clients" or "stations" (STAs)) that wirelessly communicate via any of one or more wireless APs 24(1)-24(N). In the networking environment 10, client 22(3) is a suspected rogue client and AP 24(3) is a suspected rogue AP.

A WLAN controller (WLC) 30 is provided that may be configured to perform one or more various control and management functions for the WLAN 20. In addition, the WLC 30 may be configured with software instructions or logic to execute a rogue device detection process 32, which is described in detail below. The WLC 30 communicates with the APs 24(1)-24(N) via local area network (LAN) 40 or a wide area network. While AP 24(3) is shown connected to the LAN 40, it is to be understood that the suspected rogue AP may not have a wired connection to LAN 40.

The rogue device detection process 32 could operate as an Application Programming Interface (API) accessible service in association with the WLC 30 or it may be a function running on another network management controller or entity.

Figure 2:
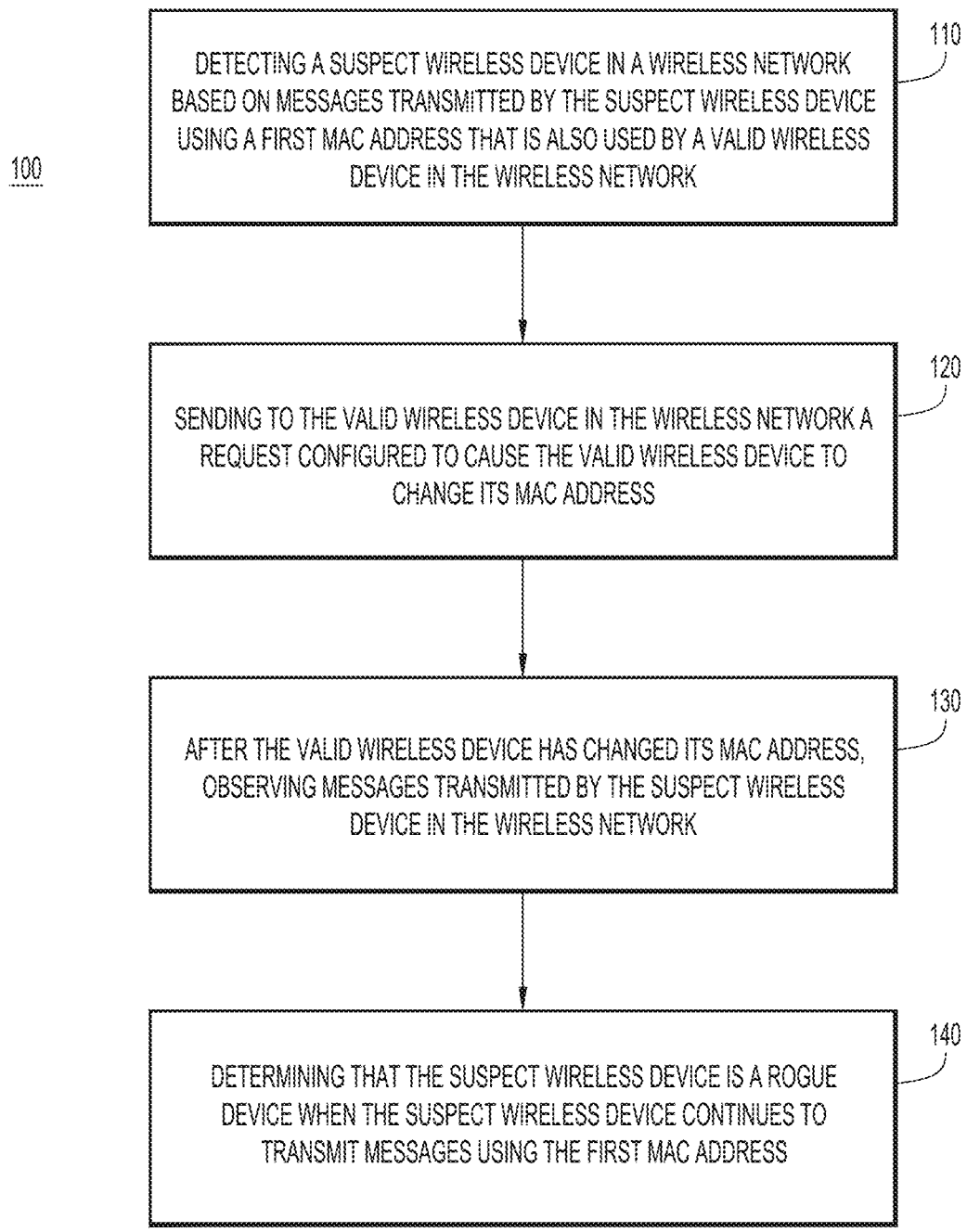
FIG. 2 is a high-level flow chart depicting a process for detecting rogue wireless devices in a wireless network, according to an example embodiment.

Turning now to FIG. 2, a high-level flow chart is shown for a method 100 performed by the rogue device detection process 32. The method 100 is performed in a wireless network to detect a rogue wireless device operating in the wireless network. At step 110, the method 100 involves detecting a suspect wireless device in the wireless network based on messages transmitted by the suspect wireless device using a first Media Access Control (MAC) address that is also used by a valid wireless device in the wireless network. At step 120, the method 100 includes sending to the valid wireless device in the wireless network a request configured to cause the valid wireless device to change or rotate its MAC address. At step 130, after the valid wireless device has changed its MAC address, the method 100 includes observing messages transmitted by the suspect wireless device in the wireless network. At step 140, the method 100 includes determining that the suspect wireless device is a rogue device when the suspect wireless device continues to transmit messages using the first MAC address.

The method 100 involves identifying a suspect rogue device that performs impersonation of a managed valid device, and triggering a MAC address rotation by the managed valid device to reveal the attacker. When an attacker is revealed, an alarm can be raised and a location/localization of the attacker is performed.

It is therefore fairly easy to throttle the MAC-rotation mechanism in a given AP/BSS or physical area (clients in a given room, etc.). The goal is not to get into a race to rotate faster than the attacker can follow. Therefore, for a given area, the first MAC rotation is important to reveal if an attacker is present. Once an attack has been revealed in a given area, triggering a second MAC rotation to reveal rogues has reduced usefulness until physical security has been conducted to remove the attacker. There is little downside to refraining from a second or subsequent MAC rotation for some configurable time interval. One implementation may involve associating location accuracy with the notion of a zone, thus triggering one rotation per zone and time interval. For example, if location relies on basic 'presence' (thus "the attacker is detected by AP1, AP2 and AP3", but no real-time location system is available to provide a better location), the first suspicion of impersonation causes a first MAC rotation of the affected system, subsequent detection from the same general area (impersonation detected by AP1, AP2 and AP3) does not cause a new rotation for some configurable interval, even if a different system is seen as impersonated. However, detection of impersonation from a different area (e.g. detected by AP3, AP4 and AP5) and a different system triggers one rotation for that other system (then no further rotation for a configurable interval).

The embodiments presented herein provide for a method to detect when an impersonator spoofs the MAC address of an AP or a client implementing MAC rotation techniques, by causing the valid device (AP or client) to rotate its MAC address at a time and in a way that the impersonator cannot guess. The AP can then contain the spoofing device.

Finally, as for containment, the techniques presented herein reveal a rogue device by changing the impersonated MAC address and having the rogue device "naked" with a previous MAC address. During this period, the MAC address can be contained, as it does not belong to any valid device anymore. In this time interval, it is useful to contain the rogue device because some other devices might think its MAC address is still valid. The rogue device could change its MAC address, but with the techniques presented herein, an impersonation has been detected, an alarm has been raised, and the rogue device's ability to pull off a successful attack has been nullified.

Figure 3:
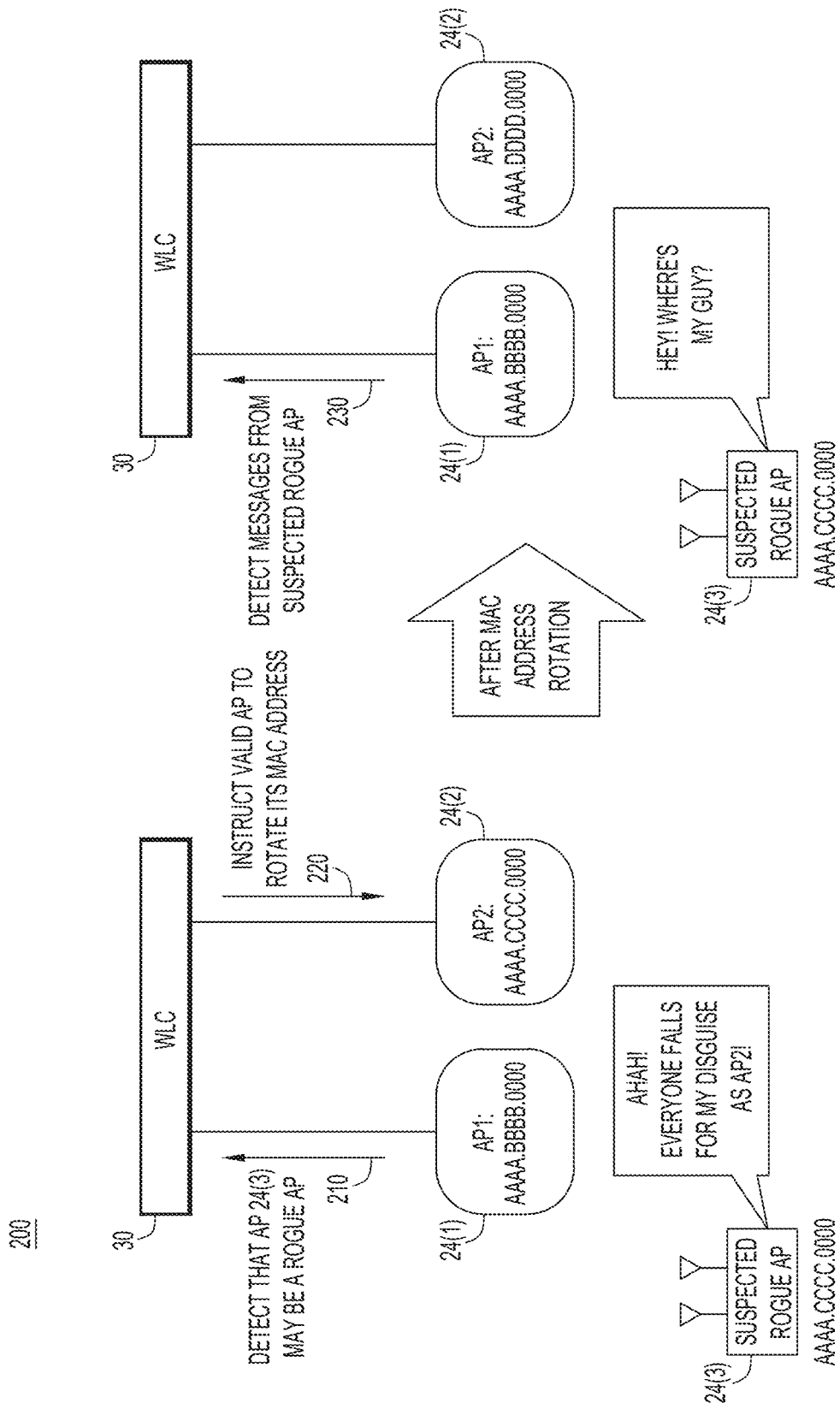
FIG. 3 is a diagram depicting an example network environment and a process for detecting a rogue wireless access point, according to an example embodiment.

Reference is now made to FIG. 3, which shows a process 200 for detecting a rogue AP, according to an example embodiment. The process 200 is shown in the context of a networking environment that includes WLC 30 (configured to perform the rogue detection process 32). The WLC 30 is in communication with APs 24(1) and 24(2). At step 210, a rogue detection feature on the WLAN reports the presence of a possible rogue device, e.g., suspected rogue AP 24(3). This may be detected in various ways that are known in the art. It is noted that the suspected rogue AP 24(3) may be using a MAC address belonging to one of the existing APs, or a prior MAC address previously used by one of the other STAs. Such detection methods are known in the art. One way to detect a suspected rogue device is to observe transmissions it makes using a MAC address already in use by a known valid device.

Suspected rogue AP 23(3) attempts to use the same MAC/BSSID of an infrastructure AP, e.g., AP 24(2), attempting to trick clients to associate with it. In the example of FIG. 3, suspected rogue AP 24(3) is using the MAC address "AAAA.CCCC.0000" which is the MAC address used by AP 24(2). Through existing rogue detection capabilities, the WLC 30 suspects that a possible rogue impersonation attack may be in progress, but does not have enough information to confirm it.

When it appears that a rogue AP may have taken the MAC address of a valid infrastructure AP, the WLC 30 sends a message to the valid infrastructure AP that is using the same MAC used by the suspected rogue AP, requesting that the valid infrastructure AP rotate its MAC address. In the example of FIG. 3, at step 220, the WLC 30 sends a message to AP 24(2) instructing it to rotate its MAC address. This message may be sent over the wire (otherwise the attacker may read the message) and secured for example through Control And Provisioning of Wireless Access Points (CAPWAP) protocol using the Datagram Transport Layer Security (DTLS) protocol, for example. It is also possible that this message be sent over-the-air (wirelessly), but in a protected format (e.g. an AP-to-AP protected session).

As shown in FIG. 3, in response to the message received at step 220, AP 24(2) changes its MAC address to "AAAA.DDDD.0000".

The impersonator (if it exists) continues (at least for a few moments) to use the previous MAC address of the valid infrastructure AP, hence making it distinguishable and providing evidence that an impersonation attack is in progress. Thus, after valid infrastructure AP 24(2) has been instructed to change its MAC address, and messages sent by the suspected rogue AP 24(3) that use the previous MAC address of AP 24(2) ("AAAA.CCCC.0000") are detected, as shown at step 230, the WLC 30 can confirm that the suspected rogue AP 24(3) is in fact a rogue AP. At this point, the management system (WLC, some higher level network management entity, etc.) generates an attack alarm, along with the attacker location using any of a variety of wireless location techniques known in the art. The location accuracy of AP 24(3) can range from 'accurate to m meters' to 'in a zone between AP1 and AP2, for example.

A similar method applies to associated (managed) wireless clients, with some slight variation. When a rogue device impersonates a managed client, the WLC 30 communicates with the valid client over-the-air with a suggestion to rotate its MAC address. The valid client then acknowledges the request, picks a new MAC address, and resumes/restarts its communication with the AP.

Figure 4:
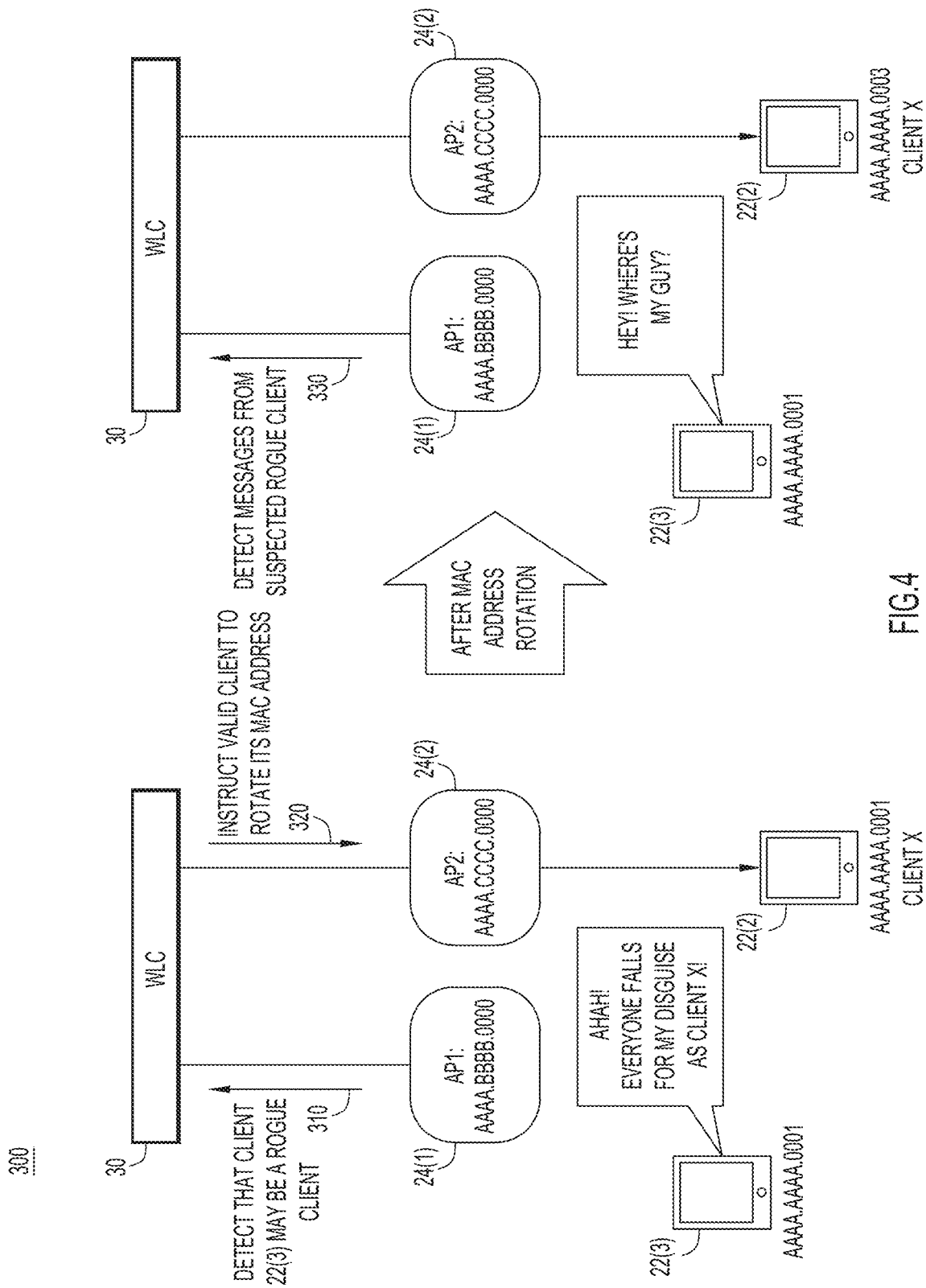
FIG. 4 is a diagram depicting an example network environment and a process for detecting a rogue wireless client, according to an example embodiment.

Reference is now made to FIG. 4 for a description of a process 300 by which a rogue client may be detected, according to one embodiment. In this example, the suspected rogue client 22(3) is associated to AP 24(1) and is using the MAC address ("AAAA.AAAA.0001") of a valid client 22(2). Thus, based on detecting messages transmitted by suspected rogue client 22(3) using the same MAC address as valid client 22(2), at step 310, the WLC 30 detects the suspected rogue client 22(3). At step 320, the WLC 30 provides a message that is to be sent wirelessly, perhaps via another AP, e.g., AP 24(2), to valid client 22(2), instructing valid client to rotate its MAC address. The message sent at step 320 is to an associated client, via a protected connection to the AP 24(2). As shown in FIG. 4, in response to receive the message sent at step 320, the valid client 22(2) changes its MAC address to "AAAA.AAAA.0003".

After valid client 22(2) rotates its MAC address, the WLC 30 may, at step 330, continue to detect messages from the suspected rogue client 22(3) with the MAC address previously used by the valid client 22(2), i.e., MAC address "AAAA.AAAA.0001". At this point, the WLC 30 can confirm that the suspected rogue client 22(3) is a rogue device, and can take appropriate alarm and remediation action (locate and disable).

Figure 5:
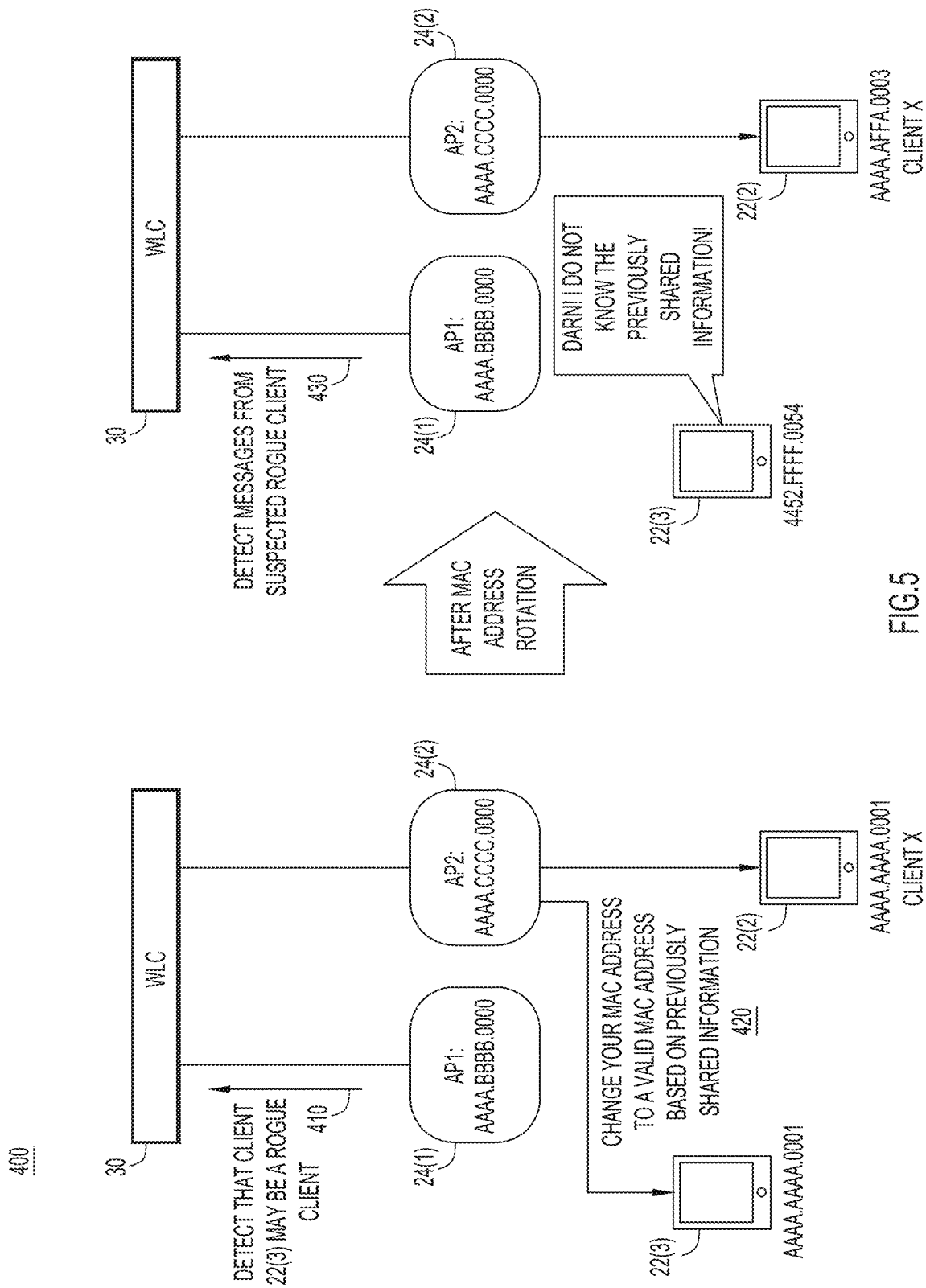
FIG. 5 is a diagram depicting an example network environment and another process for detecting a rogue wireless client, according to an example embodiment.

Reference is now made to FIG. 5 for description of yet another process 400 to detect and confirm a rogue wireless device. In this example, like FIG. 4, the suspected rogue client 22(3) is associated to AP 24(1) and is using the MAC address ("AAAA.AAAA.0001") of a valid client 22(2). Thus, based on detecting messages transmitted by suspected rogue client 22(3) using the same MAC address as valid client 22(2), at step 410, the WLC 30 detects the suspected rogue client 22(3). Next at step 420, the WLC 30 causes the AP 24(2) to send a request/instruction in an unprotected wireless message using the first MAC address of valid client 22(2), that is, MAC address AAAA.AAAA.0001 in the example of FIG. 5. Since this message is sent using the MAC address that both the valid client 22(2) and the suspected rogue client 22(3) are using, the message is received by both the valid client 22(2) and the suspected rogue client 22(3). Moreover, the request contained in the wireless message sent at step 420 is configured to cause the valid wireless client device to change its MAC address to a new valid MAC address selected based on previously shared information with the valid wireless client device. The suspected rogue client 22(3) does not have access to this previously shared information.

Thus, AP 24(2) instructs/requests the valid client 22(2) to change its MAC address based on commonly known, to the AP and valid client, information. As shown in FIG. 5, after MAC address rotation by the valid client device, at step 430, the WLC 30 can detect messages transmitted by the suspect rogue client device 22(3) and confirm that the suspect rogue client device 22(3) is in fact a rogue device when the suspect rogue client device 22(3) continues to transmit messages using the previous MAC address (e.g., "AAAA.AAAA.0001") or changes to another MAC address, e.g., "4452.FFFF.0054" that is an invalid MAC address, as shown in FIG. 5. In essence, the process 400 works similar to a revealing game, where the legitimate player makes an unpredictable move leaving the impersonator uncovered for all to see. This process repeats until the impersonator is revealed and can be removed or disabled.

In one example, the previously shared information is a valid un-attackable sequence or set of next MAC addresses shared by the valid wireless client and the network infrastructure (e.g., the AP 24(2) and/or WLC 30). Therefore, even if the suspected rogue device 22(3) detects the (possibly unprotected) wireless message, it is unable to guess and generate the next valid MAC address because it does not know the valid sequence or set of next MAC addresses or how to generate that sequence or set of MAC addresses.

In one embodiment, to ensure the plurality of MAC addresses are not easily predictable by a nefarious actor, some embodiments utilize a stateful random number generator, such as a cryptographically secure pseudo random number generator (CSPRNG) to generate each MAC address in a plurality or sequence of MAC addresses. Seed information is provided to the stateful random number generator so as to make the plurality of device addresses relatively unique across different wireless client devices.

In some embodiments, a valid wireless client device generates seed information (e.g., based on a roaming domain in which it is operating), and provides the seed information to an AP. In some other embodiments, the AP generates seed information independent of the wireless client device, and thus, the seed information exchange does not occur. In some embodiments, the seed information exchange provides seed information that is a whole number. The seed information, in some embodiments, is used by the AP to initialize a local stateful random number generator, such as a CSPRNG.

An AP may request a sequence of random numbers from a CSPRNG. The CSPRNG responds to each the requests with a different random number. The AP then generates a list of device addresses based on the three random numbers (or more). As discussed above, in some embodiments, a random number generated by a stateful random number generator (e.g., CSPRNG) does not necessarily conform to a format of a device address. The random number is, in some embodiments, a different length, or has impermissible values in one or more bit positions relative to what is allowed in a device address format. Thus, the AP performs one or more of truncation, bit shifting, exclusive or operations, hashing, masking, or other operations to generate a MAC address based on each random number received from the CSPRNG. For example, the AP generates a first MAC address, second MAC address, and third MAC address, based on each of a first random number, a second random number, and a third random number, respectively. The AP, e.g., AP 24(2), then communicates the plurality of MAC addresses generated from the three random numbers to the valid wireless client device 22(2) via an address list message.

Upon receiving the list of MAC addresses from the AP, the wireless client device 22(2) then references a first MAC address in the list of device addresses to identify itself (e.g. via a source address field) in a data message. The address list message includes a list of addresses, but also, in at least some embodiments, implies or explicitly communicates an order of the provided addresses. The order indicates which address in the list should be used first by the wireless client device 22(2), which address should be used last, etc. In some embodiments, the order is implied by an order of the addresses themselves in the address list message.

In another example, the previously shared information is a shared secret and the valid client rotates its MAC address to a next MAC address based on a function of the shared secret. For example, the request sent at step 420 is a 'challenge-like' message to the valid client 22(2) (that can also be received by the suspected rogue device 22(3) if the message is unprotected), asking the client to change its MAC address as a result of a function of some shared secret. For instance, with CSPRNG, the AP can instruct the valid client to 'change MAC to the 5-th next MAC address in the sequence' or if CSPRNG is not present, the AP can instruct the valid client to 'change MAC to the hash (h5) of a Pairwise Transient Key (PTK) previously used at time n (when the suspected rogue device was not present)' or 'change MAC address to the SHA-1 of a shared secret'.

In still another example, the previously shared information is a set of MAC addresses provided to the valid client during the initial connection with the valid client 22(2), and the request sent at step 420 triggers the valid client 22(2) to change its MAC to another MAC address in the provided set. In one example, the AP (to which the valid client initially associates) assigns the MAC addresses to the valid client during the initial connection.

In the foregoing embodiments, the instruction of changing the MAC can be accompanied with a timer (change in 'x'<time units>). Once the valid {AP, client} has changed its MAC address (and after a time period corresponding to the timer has elapsed), the AP can take aggressive containment steps to prevent the impersonator from causing further damage, by disabling wireless connectivity to the wireless network and possibly locating and destroying/disabling the rogue wireless device.

Figure 6:
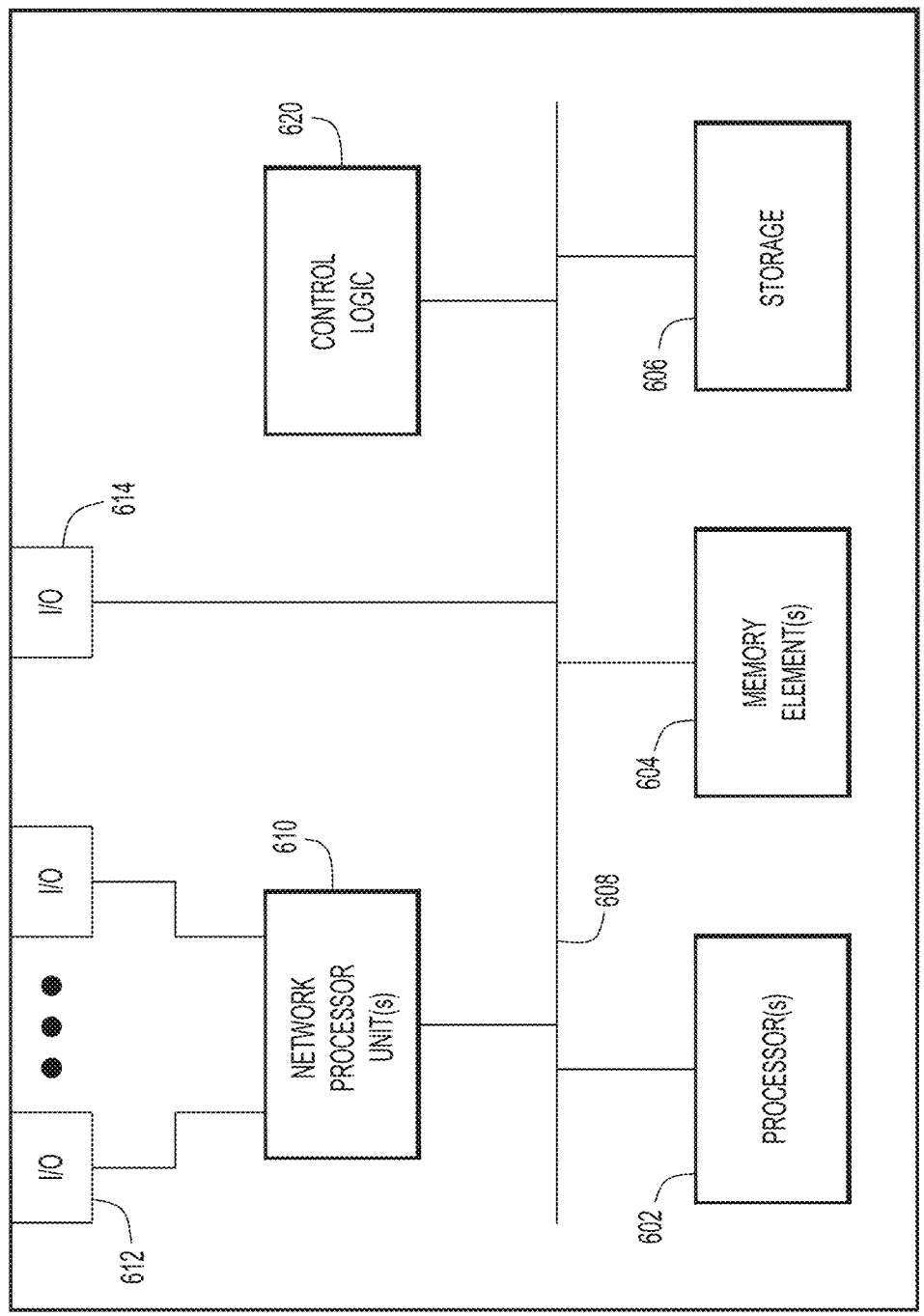
FIG. 6 is a block diagram of a network management or control device that may be configured to perform the methods presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5, such as the WLC 30.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method performed in a wireless network to detect a rogue wireless device, the method including: detecting a suspect wireless device in the wireless network based on messages transmitted by the suspect wireless device using a first Media Access Control (MAC) address that is also used by a valid wireless device in the wireless network; sending to the valid wireless device in the wireless network a request configured to cause the valid wireless device to change its MAC address; after the valid wireless device has changed its MAC address, observing messages transmitted by the suspect wireless device in the wireless network; and determining that the suspect wireless device is a rogue device when the suspect wireless device continues to transmit messages using the first MAC address.

In some aspects, the techniques described herein relate to a method, wherein the valid wireless device is a valid access point and the suspect wireless device is a rogue access point.

In some aspects, the techniques described herein relate to a method, wherein the request is a wired network message sent to the valid access point.

In some aspects, the techniques described herein relate to a method, wherein the request is a wireless message sent in a protected format between access points.

In some aspects, the techniques described herein relate to a method, wherein the valid wireless device is a valid wireless client device and the suspect wireless device is a rogue client device.

In some aspects, the techniques described herein relate to a method, wherein the request is a wireless message sent in a protected format.

In some aspects, the techniques described herein relate to a method, wherein the request is a wireless message sent using the first MAC address configured to cause the valid wireless client device to change its MAC address to a new valid MAC address selected based on previously shared information with the valid wireless client device.

In some aspects, the techniques described herein relate to a method, wherein the previously shared information is one of: (a) a valid un-attackable sequence or set of next MAC addresses from which the valid wireless client device selects a MAC address; a shared secret with which the valid wireless client device selects a MAC address based on a function of the shared secret; or a set of MAC addresses provided to the valid wireless client device during an initial connection between a wireless access point and the valid wireless client device, from which set of MAC addresses the valid wireless client device selects a MAC address.

In some aspects, the techniques described herein relate to a method, further comprising, including with the request to change the MAC address, a timer value indicating a time period by which the valid wireless device is to change its MAC address.

In some aspects, the techniques described herein relate to a method, further including disabling wireless network connectivity of the suspect wireless device after the time period has elapsed.

In some aspects, the techniques described herein relate to an apparatus including: one or more network interfaces that enable network communication including communication with one or more access points that serve one or more client devices in a wireless network; and at least one processor coupled to the one or more network interfaces, the at least one processor configured to perform operations including: detecting a suspect wireless device in the wireless network based on messages transmitted by the suspect wireless device using a first Media Access Control (MAC) address that is also used by a valid wireless device in the wireless network; causing to be sent to the valid wireless device in the wireless network a request configured to cause the valid wireless device to change its MAC address; after the valid wireless device has changed its MAC address, observing messages transmitted by the suspect wireless device in the wireless network; and determining that the suspect wireless device is a rogue device when the suspect wireless device continues to transmit messages using the first MAC address.

In some aspects, the techniques described herein relate to an apparatus, wherein the valid wireless device is a valid access point and the suspect wireless device is a rogue access point, and wherein the request is a wired network message sent to the valid access point or a wireless message sent in a protected format between access points.

In some aspects, the techniques described herein relate to an apparatus, wherein the valid wireless device is a valid wireless client device and the suspect wireless device is a rogue client device.

In some aspects, the techniques described herein relate to an apparatus, wherein the request is a wireless message sent using the first MAC address configured to cause the valid wireless client device to change its MAC address to a new valid MAC address selected based on previously shared information with the valid wireless client device.

In some aspects, the techniques described herein relate to an apparatus, wherein the previously shared information is one of: (a) a valid un-attackable sequence or set of next MAC addresses from which the valid wireless client device selects a MAC address; a shared secret with which the valid wireless client device selects a MAC address based on a function of the shared secret; or a set of MAC addresses provided to the valid wireless client device during an initial connection between a wireless access point and the valid wireless client device, from which set of MAC addresses the valid wireless client device selects a MAC address.

In some aspects, the techniques described herein relate to one or more non-transitory computer readable media encoded with instructions that, when executed by a processor, cause the processor to perform operations for a wireless network to detect a rogue wireless device, the operations including: detecting a suspect wireless device in the wireless network based on messages transmitted by the suspect wireless device using a first Media Access Control (MAC) address that is also used by a valid wireless device in the wireless network; sending to the valid wireless device in the wireless network a request configured to cause the valid wireless device to change its MAC address; after the valid wireless device has changed its MAC address, observing messages transmitted by the suspect wireless device in the wireless network; and determining that the suspect wireless device is a rogue device when the suspect wireless device continues to transmit messages using the first MAC address.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed in a wireless network to detect a rogue wireless device, the method comprising:
   detecting a suspect wireless device in the wireless network based on messages transmitted by the suspect wireless device using a first Media Access Control (MAC) address that is also used by a valid wireless device in the wireless network;
   sending to the valid wireless device in the wireless network a request configured to cause the valid wireless device to change its MAC address, wherein the request is a wireless message sent using the first MAC address configured to cause the valid wireless device to change its MAC address to a new valid MAC address in order to reveal the suspect wireless device as a rogue device, wherein the new valid MAC address is selected from a valid un-attackable set of MAC addresses;
   after the valid wireless device has changed its MAC address, observing messages transmitted by the suspect wireless device in the wireless network; and
   determining that the suspect wireless device is a rogue device when the suspect wireless device continues to transmit messages using the first MAC address.

2. The method of claim 1, wherein the valid wireless device is a valid access point and the suspect wireless device is a rogue access point.

3. The method of claim 2, wherein the request is a wired network message sent to the valid access point.

4. The method of claim 2, wherein the request is a wireless message sent in a protected format between access points.

5. The method of claim 1, wherein the valid wireless device is a valid wireless client device and the suspect wireless device is a rogue client device.

6. The method of claim 5, wherein the request is a wireless message sent in a protected format.

7. The method of claim 5, wherein the request is a wireless message configured to cause the valid wireless client device to change its MAC address to new valid MAC address selected based on previously shared information with the valid wireless client device.

8. The method of claim 7, wherein the previously shared information is one of: the valid un-attackable sequence or set of next MAC addresses from which the valid wireless client device selects a MAC address; a shared secret with which the valid wireless client device selects a MAC address based on a function of the shared secret; or a set of MAC addresses provided to the valid wireless client device during an initial connection between a wireless access point and the valid wireless client device, from which set of MAC addresses the valid wireless client device selects a MAC address.

9. The method of claim 1, further comprising including with the request, a timer value indicating a time period by which the valid wireless device is to change its MAC address.

10. The method of claim 9, further comprising disabling wireless network connectivity of the suspect wireless device after the time period has elapsed.

11. An apparatus comprising:
one or more network interfaces that enable network communication including communication with one or more access points that serve one or more client devices in a wireless network; and
at least one processor coupled to the one or more network interfaces, the at least one processor configured to perform operations including:
detecting a suspect wireless device in the wireless network based on messages transmitted by the suspect wireless device using a first Media Access Control (MAC) address that is also used by a valid wireless device in the wireless network;
causing to be sent to the valid wireless device in the wireless network a request configured to cause the valid wireless device to change its MAC address, wherein the request is a wireless message sent using the first MAC address configured to cause the valid wireless device to change its MAC address to a new valid MAC address in order to reveal the suspect wireless device as a rogue device, wherein the new valid MAC address is selected from a valid un-attackable set of MAC addresses;
after the valid wireless device has changed its MAC address, observing messages transmitted by the suspect wireless device in the wireless network; and
determining that the suspect wireless device is a rogue device when the suspect wireless device continues to transmit messages using the first MAC address.

12. The apparatus of claim 11, wherein the valid wireless device is a valid access point and the suspect wireless device is a rogue access point, and wherein the request is a wired network message sent to the valid access point or a wireless message sent in a protected format between access points.

13. The apparatus of claim 11, wherein the valid wireless device is a valid wireless client device and the suspect wireless device is a rogue client device.

14. The apparatus of claim 13, wherein the request is a wireless message configured to cause the valid wireless client device to change its MAC address to a new valid MAC address selected based on previously shared information with the valid wireless client device.

15. The apparatus of claim 14, wherein the previously shared information is one of: the valid un-attackable sequence or set of next MAC addresses from which the valid wireless client device selects a MAC address; a shared secret with which the valid wireless client device selects a MAC address based on a function of the shared secret; or a set of MAC addresses provided to the valid wireless client device during an initial connection between a wireless access point and the valid wireless client device, from which set of MAC addresses the valid wireless client device selects a MAC address.

16. One or more non-transitory computer readable media encoded with instructions that, when executed by a processor, cause the processor to perform operations for a wireless network to detect a rogue wireless device, the operations including:
detecting a suspect wireless device in the wireless network based on messages transmitted by the suspect wireless device using a first Media Access Control (MAC) address that is also used by a valid wireless device in the wireless network;
sending to the valid wireless device in the wireless network a request configured to cause the valid wireless device to change its MAC address, wherein the request is a wireless message sent using the first MAC address configured to cause the valid wireless device to change its MAC address to a new valid MAC address in order to reveal the suspect wireless device as a rogue device, wherein the new valid MAC address is selected from a valid un-attackable set of MAC addresses;
after the valid wireless device has changed its MAC address, observing messages transmitted by the suspect wireless device in the wireless network; and
determining that the suspect wireless device is a rogue device when the suspect wireless device continues to transmit messages using the first MAC address.

17. The one or more non-transitory computer readable media of claim 16, wherein the valid wireless device is a valid access point and the suspect wireless device is a rogue access point, and wherein the request is a wired network message sent to the valid access point or a wireless message sent in a protected format between access points.

18. The one or more non-transitory computer readable media of claim 16, wherein the valid wireless device is a valid wireless client device and the suspect wireless device is a rogue client device.

19. The one or more non-transitory computer readable media of claim 18, wherein the request is a wireless message configured to cause the valid wireless client device to change its MAC address to a new valid MAC address selected based on previously shared information with the valid wireless client device.

20. The one or more non-transitory computer readable media of claim 19, wherein the previously shared information is one of: the valid un-attackable sequence or set of next MAC addresses from which the valid wireless client device selects a MAC address; a shared secret with which the valid wireless client device selects a MAC address based on a function of the shared secret; or a set of MAC addresses provided to the valid wireless client device during an initial connection between a wireless access point and the valid wireless client device, from which set of MAC addresses the valid wireless client device selects a MAC address.

* * * * *